United States Patent [19]
Bordwell et al.

[11] Patent Number: 5,710,392
[45] Date of Patent: Jan. 20, 1998

[54] ELECTRICAL OUTLET BOX ASSEMBLY HAVING A REMOVABLE COVER

[75] Inventors: Mark A. Bordwell; James A. Feeney, Jr., both of Memphis, Tenn.

[73] Assignee: Thomas & Betts Corporation, Memphis, Tenn.

[21] Appl. No.: 543,645

[22] Filed: Oct. 16, 1995

[51] Int. Cl.[6] .................................................. H02B 1/40
[52] U.S. Cl. ........................ 174/50; 220/3.8; 220/327
[58] Field of Search ............................ 220/3.4, 3.8, 3.3, 220/327; 174/50, 67, 48

[56] References Cited

U.S. PATENT DOCUMENTS

| | | | |
|---|---|---|---|
| 2,891,755 | 10/1955 | Clark | 248/220.5 |
| 3,015,408 | 1/1962 | Campbell et al. | 220/3.4 |
| 3,438,536 | 4/1969 | Tarchalski | 220/27 |
| 3,601,276 | 8/1971 | Culpepper | 220/3.8 |
| 4,770,311 | 9/1988 | Wang | 220/3.3 |
| 4,892,211 | 1/1990 | Jorgensen | 220/3.2 |
| 4,907,711 | 3/1990 | Stuchlik, III | 220/3.8 |
| 4,915,638 | 4/1990 | Domian | 439/142 |
| 4,919,292 | 4/1990 | Hsu | 220/3.2 |
| 5,003,128 | 3/1991 | Grondin | 174/67 |
| 5,026,295 | 6/1991 | Fong et al. | 439/135 |
| 5,180,074 | 1/1993 | Bowman et al. | 220/3.8 |
| 5,359,152 | 10/1994 | Hone-Lin | 174/53 |

*Primary Examiner*—Kristine L. Kincaid
*Assistant Examiner*—Joseph Waks
*Attorney, Agent, or Firm*—Michael L. Hoelter; Salvatore J. Abbruzzese

[57] ABSTRACT

An improved electrical outlet box assembly includes an outlet box and a cover. The outlet box includes a bottom wall and a sidewall perimetrically bounding the bottom wall and an open upper end. The sidewall supports a pair of diametrically opposed ear lugs. Each ear lug has a pair of ears integrally formed therewith extending inwardly into the interior of the box. The ears secure a fastening element. The cover is removably frictionally engagable with the box and provides a closure for the open upper end of the box. The cover includes a generally planar surface with a pair of diametrically opposed dome-shaped protrusions extending from the top surface of the cover. The protrusions are positioned on the cover such that they align with the ears and accommodate the fastening elements therein. The cover further includes a pair of locking members extending from the bottom surface of the cover and which are frictionally engagable with the ears thereby holding the cover onto the outlet box.

18 Claims, 4 Drawing Sheets

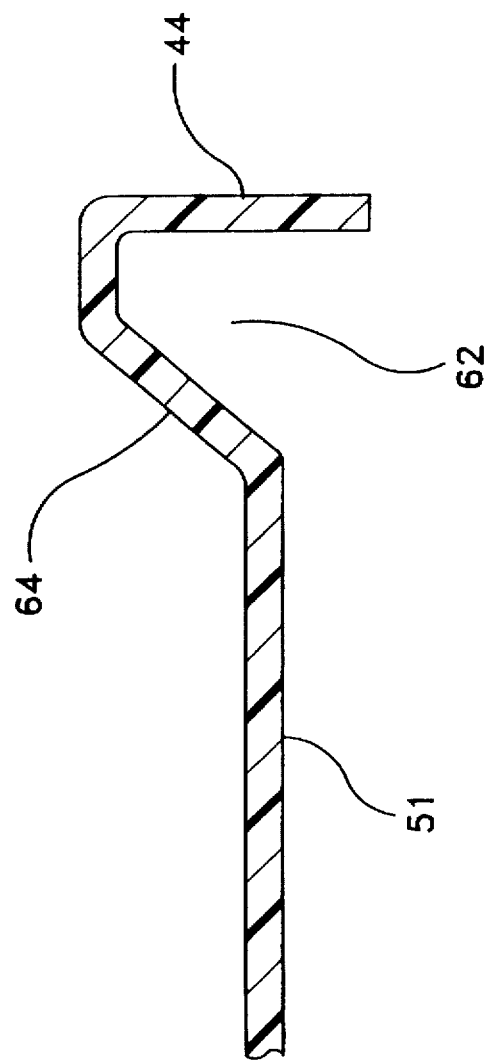

ELECTRICAL OUTLET BOX ASSEMBLY HAVING A REMOVABLE COVER

FIELD OF THE INVENTION

The present invention relates generally to electrical outlet boxes. More particularly, the present invention relates to an electrical outlet box having a cover which snaps onto the outlet box, providing an enclosure for retaining mounting hardware during shipping and subsequent handling and preventing contaminants from entering the box during the construction process.

BACKGROUND OF THE INVENTION

Electrical outlet boxes provide a termination point for wiring running through buildings and houses. Wiring entering these boxes is connected to a particular electrical fixture or receptacle such as lighting fixtures, outlets or switches. These boxes, if so properly designed, can also be used to support fixtures such as ceiling fans.

Outlet boxes are generally shipped from the manufacturer together with various pieces of mounting hardware. This hardware usually includes screws and/or brackets used to attach the outlet box to a stud or beam, as well as screws used to attach a fixture to the box. Such hardware is normally placed inside the outlet box which is then placed into a packaging box for shipping. As the package travels from the manufacturer to a distributor to a construction site, the box tends to open and the relatively small mounting hardware components may fall out. Furthermore, the mounting hardware is often inadvertently separated from the outlet box on a construction job site when the boxes are opened prior to installation. When the hardware is inadvertently separated from the outlet box, the installer must then waste time trying to locate the missing hardware or find replacement hardware prior to installing the box.

In use, outlet boxes are frequently located within the walls or ceiling with only the attached fixture being visible. The outlet boxes are typically fastened to a beam or stud and the wiring is then run into the box, usually through an opening in the side or back of the box. However, in a typical construction project where such boxes are used, the boxes are installed prior to the walls or ceilings being installed. This electrical "roughing" as it is referred to, is done prior to the wall or ceiling installation whenever possible in order to reduce the difficulty of installing the electric wiring.

After the "rough" wiring is completed, the walls and ceiling are then installed. A very common material used for ceilings and especially walls is a plaster-filled fiberboard referred to as drywall. Cutouts are taken from the boards in locations which correspond with the outlet boxes. Therefore, when the boards are first hung, the outlet box and its contents, such as mounting hardware or wires, are generally exposed. The seams created when these boards are hung are normally filled with a spackling compound. Spackling compound is liberally spread around the seams and around other areas such as the drywall nails or screws used to hold up the board.

As a result of the spackling process, spackle often gets into the outlet boxes. The spackle compound may cover the mounting hardware contained in the box, as well as cover the wires located in the box. Once this spackle dries, it is difficult and time consuming to remove. This is especially the case when the spackle has filled in the screw driver slots in the head of the mounting screws. In addition, spackle which dries on the wires must be removed in order for a proper electrical connection to be made between the wire and the electrical fixture.

In addition to spackle, an outlet box may be contaminated by dust and other debris commonly encountered at a construction site. Also, other coating type materials are typically applied prior to the fixtures being attached. Materials such as plaster, tile grout, wallpaper paste and paint can coat the various contents of the outlet box and are difficult and time consuming to remove.

Attempts have been made in the past to protect the inside of an outlet box from being contaminated by plaster. Such an attempt is described in U.S. Pat. No. 3,015,408 to Campbell et al. This patent describes a cover to an outlet box having a flexible rod-like locator member extending from the cover. The cover disclosed in this patent is secured to the outlet box by a pair of prongs located on the back of the cover. These prongs fit into and frictionally engage with the mounting holes on the box which are used to secure a permanent cover plate or fixture. Outlet boxes, however, are often shipped with plate/fixture mounting screws inserted in these holes. Therefore, with this invention the fixture mounting screws must either be removed by the user prior to installing the cover or the manufacturer must ship the outlet box with the cover in place and the screws uninstalled.

Accordingly, it is desirable to provide an outlet box having a cover which can prevent mounting hardware from being misplaced and which can also prevent spackle and other debris from contaminating the assembled mounting hardware and wires contained in the outlet box.

SUMMARY OF THE INVENTION

It is an object of the present invention to provide an electrical outlet box including a cover.

It is a further object of the present invention to provide an electrical outlet box having a cover which is removably frictionally engagable with outlet box.

It is still a further object of the present invention to provide an electrical outlet box assembly where the outlet box includes a pair of diametrically opposed ears adapted to receive a fastening element, such as a screw, for securing a fixture plate to the outlet box, and where the cover has dome-shaped protrusions which provide clearance for the fastening elements when the cover is in place.

It is yet another object of the present invention to provide an electrical outlet box assembly where the cover has a pair of locking members extending from the bottom surface thereof for frictionally engaging the ears thereby securing the cover to the outlet box.

In the efficient attainment of these and other objects, the present invention provides an outlet box having a cover. The outlet box includes a bottom wall and an upwardly extending sidewall perimetrically bounding the bottom wall. The box further includes a pair of diametrically opposed ears secured to the sidewall of the outlet box and extending inwardly towards the interior of the box. The cover is removably positionable over the box. The cover has a generally planar surface and a pair of locking members extending from the bottom surface of the cover. The locking members frictionally engage the ears of the outlet box, thereby retaining the cover on the box.

As more specifically described by way of the preferred embodiment herein, the outlet box sidewall has a pair of diametrically opposed lugs which each support an upper and lower ear. The upper ear has a hole that is adapted to threadingly receive a mounting screw and the lower ear has a hole which is unthreaded to provide lateral support for the screw. The cover has a pair of diametrically opposed dome-shaped indentations that align with the holes in the ears.

These indentations provide clearance between the tops of the mounting screws and the cover when the cover is in place. The cover further includes a lip-shaped locking member located adjacent to the indentations. The locking members engage the front bottom portion of the upper ear when the cover is in place, thereby securing the cover to the outlet box.

BRIEF DESCRIPTION OF THE DRAWINGS

FIG. 4 is a vertical cross-section of the portion of the cover of FIG. 2 taken through lines IV—IV thereof.

DETAILED DESCRIPTION OF THE PREFERRED EMBODIMENTS

Figure 1:
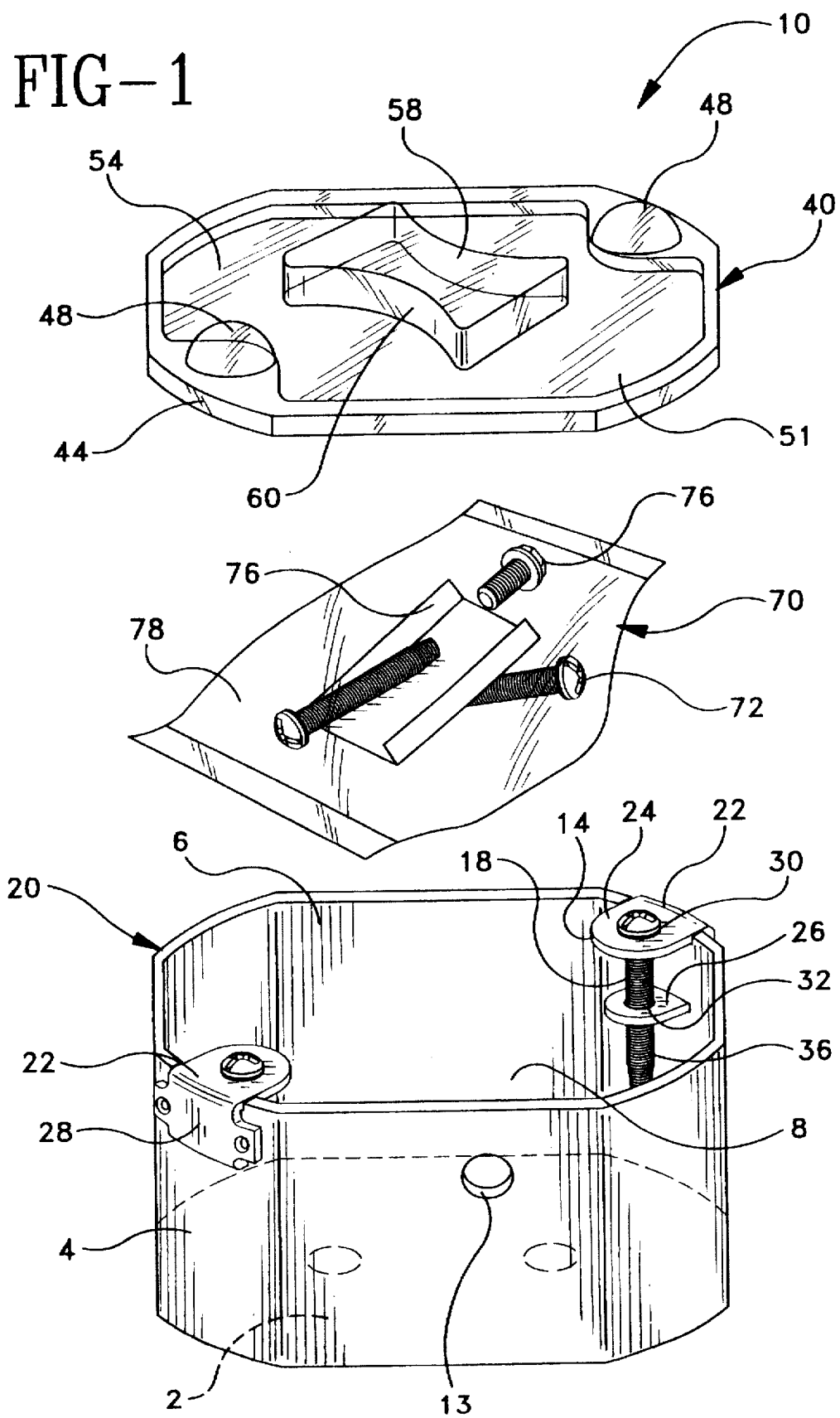
FIG. 1 is an exploded perspective view of the electrical outlet box assembly of the present invention with the cover shown positioned over the outlet box.

With reference to FIG. 1, an electrical outlet box assembly 10 is shown. Box assembly 10 includes an outlet box 20, a cover 40 and mounting hardware 70. It is understood that the outlet box 20 shown herein may include a variety of electrical boxes such as switch boxes or junction boxes. Outlet box 20 is generally a metallic member including a bottom wall 2 perimetrically bounded by a sidewall 4 which extends upward from bottom wall 2 to define an outlet box interior 6. Outlet box 20 has an open upper end 8 which is defined by a rim 12 of sidewall 4. Outlet box 20 includes a plurality of openings 13 formed in bottom wall 2 and sidewall 4 to permit mounting hardware to be used to secure outlet box 20 to a stud or beam (not shown).

Outlet box 20 of the present invention may include any of the standard shapes conventionally employed for such boxes. Such shapes may include octagonal, round or square boxes.

Figure 2:
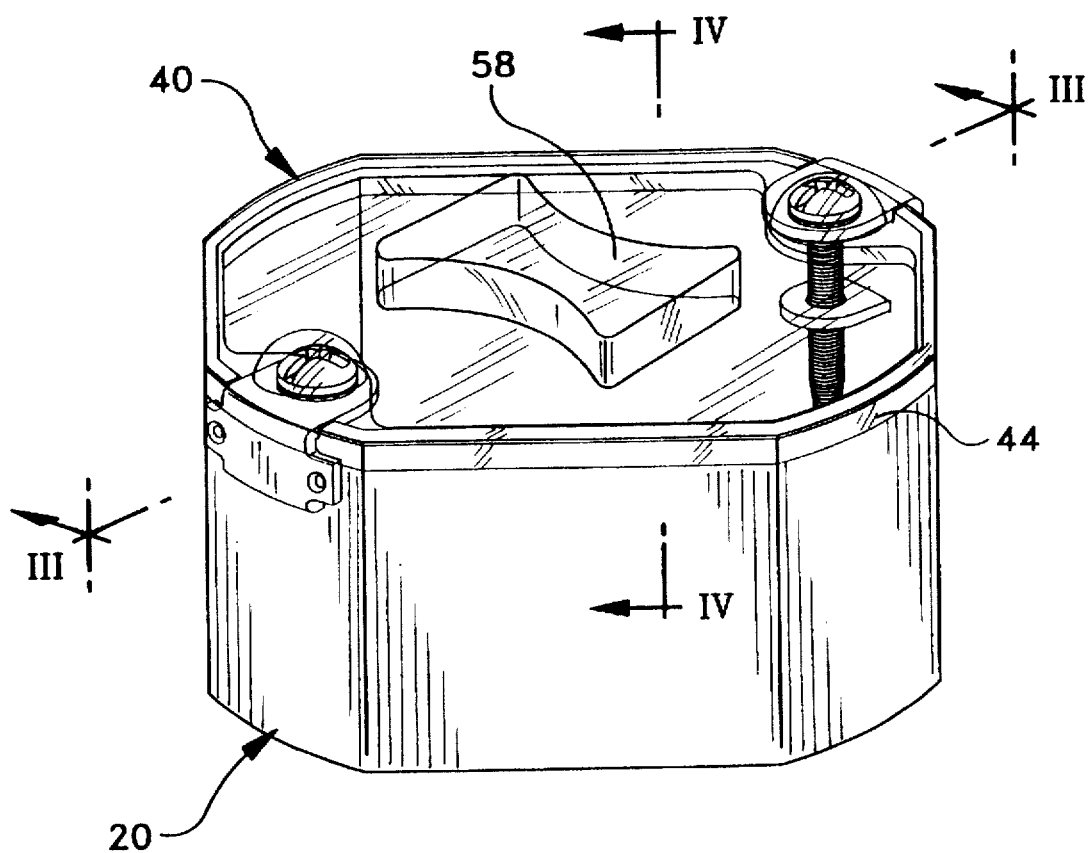
FIG. 2 is a perspective view of the electrical outlet box assembly of FIG. 1 with the cover shown in place.
Figure 3:
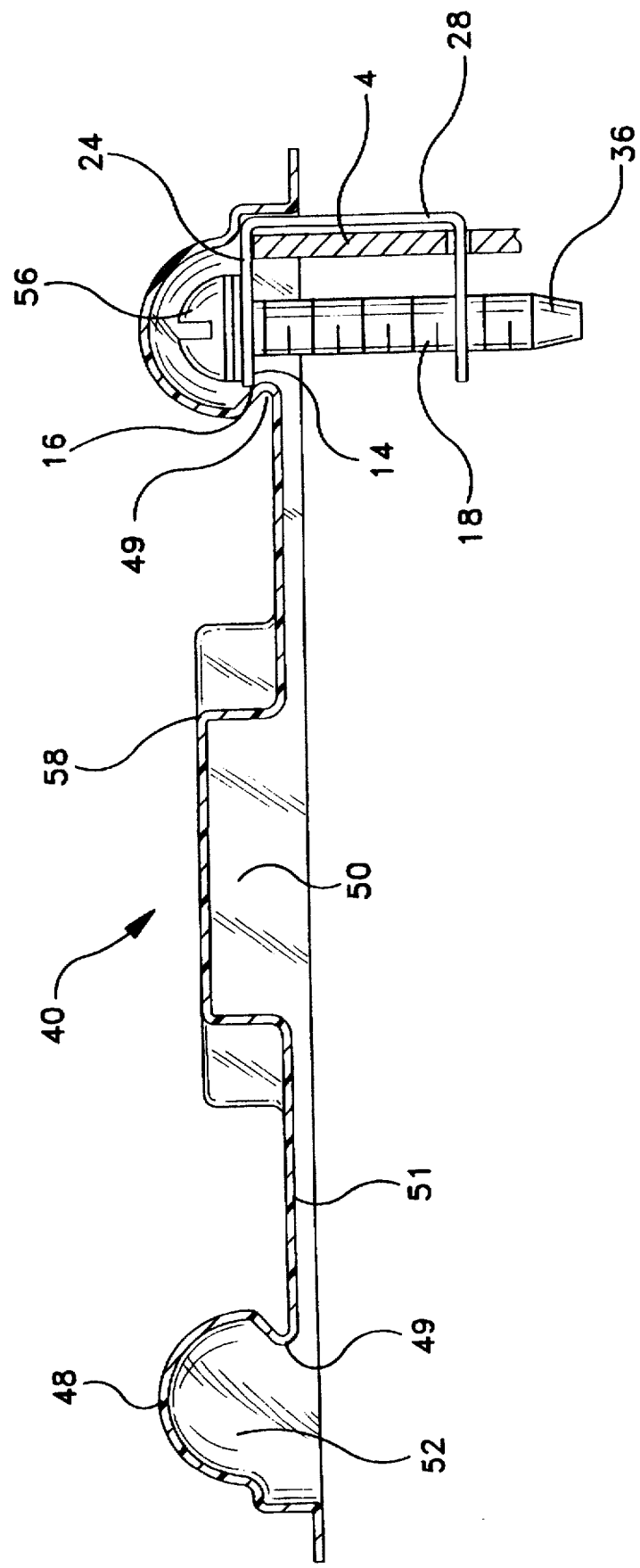
FIG. 3 is a vertical cross-section of the outlet box and cover of FIG. 2 taken through lines III—III thereof.

Outlet box 20 as shown in FIGS. 1–3 further includes sidewall 4 being adapted to receive a pair of diametrically opposed ear lugs 22. Each ear lug 22 includes an upper and lower ear 24, 26. The upper and lower ears 24, 26 are spaced apart and separated by a web 28. Web 28 is preferably spot welded to the exterior surface of sidewall 4 between the upper and lower ears 24, 26. Ears 24, 26 extend inwardly towards the outlet box interior 6 in cantilevered fashion.

Each of the upper ears 24 has a mounting hole 30 formed therethrough and each of the lower ears 26 has a receiving hole 32 formed therethrough. Mounting hole 30 of ears 24 has a smaller diameter than receiving hole 32 of ear 26 and is adapted to receive a fixture mounting screw 18, the screw being preferably self tapping. Mounting screws 18 are used to secure a fixture, cover plate or electrical receptacle (not shown) to outlet box 20. Fixture mounting screws 18 are generally supplied with the outlet box and are screwed into the ears 24, 26 as shown in FIGS. 1–3. Each receiving hole 32 is non-threaded and provides lateral support for the distal end 36 of the screw, thereby preventing unwanted flexing of the ears 24, 26, which in conventional outlet boxes frequently leads to stress-related failure. Such two-point support of the fixture mounting screw is especially important in applications where a ceiling fan is connected to the outlet box. This feature is more fully described in commonly assigned U.S. application Ser. No. 08/375,438 filed Jan. 17, 1995, entitled "Ceiling Fan Outlet Box" and which is incorporated by reference herein.

Cover 40 as shown in FIGS. 1–3 is removably positioned over open upper end 8 of outlet box 20. Cover 40 has a generally planar top surface 54 and an opposed bottom surface 56. Cover 40 is bounded at its periphery by a perimetric depending skirt 44. Cover 40 is formed to have a configuration similar to that of outlet box 20 such that when the cover is in place, skirt 44 lies about sidewall 4 of the outlet box just below rim 12. Skirt 44 provides rigidity to the cover in addition to providing a means of sealing outlet box 20. Skirt 44 assists in properly positioning cover 40 over the open upper end 8 of outlet box 20.

As shown in FIGS. 1–3, cover 40 is preferably formed with diametrically opposed dome-shaped indentations 52 in the bottom surface 51 of cover 40. These indentations 52 form a complementary pair of dome-shaped protrusions 48 extending upwardly from the top surface 54 of cover 40. These protrusions 48 are disposed on the cover 40 such that when the cover is placed on the outlet box the protrusions 48 align with the mounting holes 30. The protrusions 48 provide clearance between the cover 40 and the heads 56 of the mounting screws 18 when the cover 40 is in place and the fixture mounting screws 18 are supported in place by lugs 22 as shown in FIGS. 2 and 3.

As further shown in FIG. 3, adjacent to each indentation 52 is a lip-shaped locking member 49 which extends inwardly towards the center of the indentation 52. When the cover is placed onto the outlet box, each locking member 49 frictionally engages upper ear 24 at a locking point 16 adjacent to a front edge 14 of each upper ear 24. As cover 40 is placed on the outlet box, the locking member 49 detents as it rides over front edge 14. Upon passing front edge 14, the locking member 49 snaps back under the front edge ear 24 thereby securing cover 40 to outlet box 20.

The amount of frictional force must be sufficient to securely hold cover 40 onto outlet box 20 during shipping and subsequent handling of the outlet box so that mounting hardware 70 stored in outlet box 20 does not fall out. The frictional force, however, must not be too great whereby the cover 40 becomes too difficult to install or remove.

Cover 40 further includes a handle 58 protruding from the top surface 54 of the cover. Handle 58 is preferably formed by an indentation 50 in the bottom surface 51 which results in handle 58 extending upwardly from the top surface 54 of the cover. Handle 58 provides a gripping surface 60 which can be used by an installer to grip and remove the cover. Such a handle 58 is especially useful when the outlet box 20 is mounted in the wall or ceiling and the skirt 44 of the cover is no longer accessible. When an electrical receptacle, switch or fixture is ready to be installed, the installer can use handle 58 to remove cover 40. In addition, the indentation 50 formed by handle 58 provides additional internal volume for accommodating hardware. This is particularly beneficial in boxes having a thin or shallow profile.

Cover 40 is preferably made of plastic by a vacuum molding process in order to allow the cover to be economically manufactured. The particular plastic preferably employed is polyvinyl chloride. Furthermore, the plastic is preferably transparent in order to allow the contents of the outlet box, such as mounting hardware 70, to be seen with cover 40 in place. Further, the transparent cover allows the interior of the box to be viewed after installation. This permits inspection of the installed box.

The mounting hardware that is shipped with the outlet box preferably may include screws 72 and a bracket 74 that can be used to secure outlet box 20 to a beam or stud. A grounding screw 76 which secures a grounding wire to the outlet box is also preferably shipped with the outlet box. These components are preferably sealed in a plastic bag 78 to further reduce the chances of the components being misplaced.

In the present illustrative embodiment, the bottom surface 51 of the cover has a channel 62 running along the outer perimeter of cover 40 as shown in FIG. 4. The top surface 54 of the cover is raised upward to accommodate channel 62. Channel 62 is generally U-shaped and bounded on one side by skirt 44 and on the other side by an inner wall 64. Channel 62 is sized to closely fit over the rim 12 of the outlet box to help achieve the desired securement feature. Further, the walls of channel 62 add rigidity to the cover 40.

The present invention is described in the preferred embodiments shown herein as an outlet box having ear lugs, each lug having two pairs of ears. It, may however, be appreciated that conventional electrical outlet boxes having a single pair of inwardly extending ears integrally formed from the outlet box are within the contemplation of the present invention.

Various changes to the foregoing described and shown structures would now be evident to those skilled in the art. Accordingly, the particularly disclosed scope of the invention is set forth in the following claims.

What is claimed is:

1. An electrical outlet box assembly comprising:

an outlet box having a bottom wall, an upwardly extending sidewall perimetrically bounding said bottom wall, an open upper end defining a box interior therein and a first pair of opposed ears, each ear being secured to said sidewall and extending inwardly towards said box interior, each ear of said first pair including a mounting hole therethrough adapted to threadedly support a screw for mounting electrical fixtures to said outlet box; and an outlet box cover removably positionable over said open upper end of said box, said cover having a generally planar top and bottom surface and a pair of locking members disposed on said bottom surface of said cover, said locking members being frictionally engagable with said ears for frictionally retaining said cover on said box, said cover further including a pair of opposed indentations extending upwardly from said top surface of said cover and disposed on said cover such that each indentation aligns with said mounting hole for accommodating said screws supported by said ears.

2. An electrical outlet box assembly of claim 1, wherein each of said ears of said first pair include a bottom surface, said locking members frictionally engaging said bottom surface of said ears when the cover is placed onto said box.

3. An electrical outlet box assembly of claim 1, wherein said locking members are disposed adjacent to said indentations.

4. An electrical outlet box assembly of claim 1, wherein said box further includes a second pair of ears rigidly secured to said sidewall between said first pair of ears and said bottom wall and extending inwardly toward said box interior, each of said second ears having a receiving hole therethrough, each of said receiving holes being axially aligned with one of said mounting holes, for permitting non-engageable passage of said screws therethrough.

5. An electrical outlet box assembly of claim 1, wherein said cover further includes a handle upwardly extending from said top surface of said cover for providing a gripping area to effect manual removal of said cover from said box.

6. An electrical outlet box assembly of claim 5, wherein said handle further comprises a handle indentation formed in said bottom surface of said cover.

7. An electrical outlet box assembly of claim 1, wherein said cover is transparent.

8. An electrical outlet box assembly of claim 1, wherein said cover is a vacuum formed plastic member.

9. An electrical outlet box assembly of claim 4, wherein said box further includes a pair of ear lugs, each of said ear lugs integrally supporting one of said first ears and one of said second ears, said first and second ears of each of said lugs being spaced apart and separated by a web mounted exteriorly of said sidewall of said box.

10. An electrical outlet box assembly of claim 1, wherein said cover includes a perimetric skirt.

11. An electrical outlet box assembly of claim 10, wherein said sidewall of said box further comprises a top rim adjacent to said upper end; and said cover further includes a U-shaped channel perimetrically bounding said cover, said skirt forming an outer wall of said channel, said channel being sufficiently sized to accommodate said rim therein.

12. An electrical outlet box assembly comprising:

an outlet box having a bottom wall, a upwardly extending sidewall perimetrically bounding said bottom wall, an open upper end defining a box interior therein, and a pair of opposed lugs secured to said sidewall, each lug having first and second ears extending inwardly towards said box interior, said first and second ears each having a hole therethrough with each of said holes of said first and second ears being axially aligned to receive and support a mounting screw extending therethrough; and an outlet box cover removably positionable over said open upper end of said box, said cover having a generally planar top and bottom surface, a skirt extending thereabout, and a pair of opposed locking members frictionally engagable with said first ears for frictionally retaining said cover on said box, said cover further including a pair of opposed indentations extending upwardly from said top surface of said cover and disposed on said cover such that each indentation aligns with said axially aligned holes of each lug for accommodating said mounting screws supported by said first and second ears.

13. An electrical outlet box assembly of claim 12, wherein said holes of each of said first ears are threaded to threadedly engage said mounting screw and said holes of each of said second ears are unthreaded to non-engagingly accommodate said mounting screw therethrough.

14. An electrical outlet box assembly of claim 12, wherein each of said lugs further includes a web extending between and separating said first and second ears.

15. An electrical outlet box assembly of claim 14, wherein said lug is secured to said box sidewall.

16. An electrical outlet box assembly of claim 14, wherein said web is secured to an exterior surface of said sidewall.

17. An electrical outlet box assembly comprising:

an outlet box having a bottom wall, an upwardly extending sidewall perimetrically bounding said bottom wall, an open upper end defining a box interior therein, said side wall of said box further including a top rim adjacent to said upper end;

a first pair of opposed ears, each ear being secured to said sidewall and extending inwardly towards said box interior; and an outlet box cover removably positionable over said open upper end of said box, said cover having a generally planar top and bottom surface and a pair of locking members disposed on said bottom surface of said cover, said locking members being frictionally engagable with said ears for retaining said cover on said box, said cover further including a U-shaped channel perimetrically bounding said cover, and a perimetric skirt extending about said cover forming an outer wall of said channel, said channel being sufficiently sized to accommodate said rim therein.

18. An electrical outlet box assembly comprising:

an outlet box having a bottom wall, an upwardly extending sidewall perimetrically bounding said bottom wall, an open upper end defining a box interior therein and a first pair of opposed ears, each ear being secured to said sidewall and extending inwardly towards said box interior, each ear of said first pair including a mounting hole therethrough adapted to threadedly support a screw for mounting electrical fixtures to said outlet box; and an outlet box cover removably positionable over said open upper end of said box, said cover having a generally planar top and bottom surface and a pair of locking members disposed on said bottom surface of said cover said locking members being engagable with said ears for retaining said cover on said box, said cover further including a pair of opposed indentations extending upwardly from said top surface of said cover and disposed on said cover such that each indentation aligns with said mounting hole for accommodating said screws supported by said ears.

* * * * *